United States Patent [19]

Tanaka

[11] Patent Number: 4,493,772
[45] Date of Patent: Jan. 15, 1985

[54] FILTER FOR REMOVING WATER FROM WATER-CONTAINING OIL AND METHOD FOR THE SAME

[75] Inventor: Koji Tanaka, Okayama, Japan

[73] Assignee: Japan Exlan Company Limited, Osaka, Japan

[21] Appl. No.: 335,275

[22] Filed: Dec. 28, 1981

[30] Foreign Application Priority Data

Dec. 29, 1980 [JP] Japan .................... 55-185970

[51] Int. Cl.³ .............................. B01D 39/04
[52] U.S. Cl. ....................... 210/799; 210/806; 210/508; 210/DIG. 5
[58] Field of Search ............... 210/708, 799, DIG. 5, 210/491, 502, 504, 505, 508, 693, 689, 806, 314, 323.1; 208/188

[56] References Cited

U.S. PATENT DOCUMENTS

| | | | |
|---|---|---|---|
| 3,306,871 | 2/1967 | Miller | 260/29.7 |
| 4,009,138 | 2/1977 | Kobashi et al. | 260/29.6 RW |
| 4,212,733 | 7/1980 | Goto et al. | 210/505 |
| 4,309,289 | 1/1982 | Head | 210/799 |

FOREIGN PATENT DOCUMENTS

0149178 12/1978 Japan .................... 210/689

*Primary Examiner*—Peter Hruskoci
*Attorney, Agent, or Firm*—Wenderoth, Lind & Ponack

[57] ABSTRACT

A filter capable of separating and removing water semi-permanently from oil by effectively transforming water which is finely, stably dispersed in oil into coarse drops, which filter is composed of a fiber assembly formed with a particular binder, and a method for separating and removing water by passing the oil to be treated through said filter.

11 Claims, No Drawings

FILTER FOR REMOVING WATER FROM WATER-CONTAINING OIL AND METHOD FOR THE SAME

BACKGROUND OF THE INVENTION

1. Field of the Invention

The present invention relates to a filter for removing water from water-containing oil and a method for such removal, and more particularly to a filter for removing water from water-containing oil which is composed of a fiber assembly formed at a particular density with a specific binder, and to a method for separating and removing water by passing the oil to be treated through said filter thereby transforming the water into coarse drops.

2. Description of the Prior Art

In recent years, there has been a strong demand for the realization of a technical means which makes it possible to lengthen the usable life of oil or to recover and reuse it by removing water, especially water which forms a stable emulsion, contained in organic liquids (oils) such as insulating oils, lubricating oils, organic solvents, etc. which are non-miscible with water. For this purpose, inorganic salts in the form of granules, for example, silica gel, zeolite, etc. are being used to some extent. Although it is possible to remove water to some degree by using these inorganic salts, their water-removing power is extremely low. In addition, such salts involve an intrinsic defect of remaining in the liquids in slight quantities after purification, and therefore their use has been limited. Also, the use of fibers having a certain degree of moisture- or water-absorbing properties, such as natural pulp, etc. has been attempted in some cases, but their water-removing ability has been very low, and poor from a practical standpoint.

We considered the instantaneous high water absorbing power and water holding power of water swellable polymers (hydrogels) and studied whether they could be utilized as a material for the removal of water contained in organic liquids. However, in the case of using a hydrogel in the form of granules, they swelled instantaneously and clogged the interspaces or gaps among the granules because of their excellent water-absorbing ability, and therefore we were obliged to stop the water removal treatment after a very short time. In order to avoid such gap-clogging, we tried to use a hydrogel in fiber form and found that it was possible to prolong the time of the water removal treatment to some degree in comparison with the case of granular hydrogels, but by reason of swelling and yielding of the fibers, we were not able to solve the problem of gap-clogging, and therefore it was impossible to cause such a fiber-form hydrogel to exhibit its water-absorbing power. Thereupon, as we proposed in Laid-Open Japanese Patent Application No. 106537/1980, we found that the use of a single element product from water-swellable fibers having a multi-phase structure composed of a hydrogel outer layer and an inner layer of an acrylonitrile polymer and/or another polymer or a compounded product of said fibers and other fibers, makes it possible to continue the water-removing treatment for a long time without gap clogging or yielding of the fibers, and to exhibit the water-absorbing power of the hydrogel.

By using the water-removing material described in this prior application, it has become possible to continue the water-removing treatment for a long time, but as apparent from its mechanism of action, it is impossible to continue the water-removing operation beyond the water-swellability (water-absorbing power) of the water-swellable fibers composing the water-removing filter. Accordingly, this filter is a means that can be used satisfactorily in the regeneration treatment of oil which contains trace quantities of water.

SUMMARY OF THE INVENTION

Under such circumstances, we studied intensively to provide a water-removing filter which can be used semi-permanently. As a result, it was surprisingly found that, by making the oil under treatment pass through a filter composed of a fiber assembly formed with a specific binder, the water finely dispersed stably in the oil can be effectively transformed into coarse drops and thereby can be separated and removed for a semi-permanent length of time. The present invention has been accomplished on the basis of this discovery.

Therefore, the principal object of the present invention is to provide a water-removing filter having an excellent water-removing ability and which can be used for a semi-permanent length of time for treating oils (organic liquids) containing quantities, over a large extent, of water dispersed therein. Another object is to provide an industrially advantageous method for separating and removing water from water-containing oils by means of such filter.

A different object of the present invention is to provide a water-removing filter having a density (the interspaces among the fibers) which can be suitably adjusted because it is composed of a fiber assembly, and which is applicable over a wide range of conditions of the viscosity, water content, feed speed, etc. of the oil to be treated. Further objects of the present invention will become apparent from the following concrete explanation of the invention.

The water-removing filter usable for water-containing oils which is able to attain the above-mentioned objects of the present invention is composed of a fiber assembly formed with a binder of a polymeric aqueous emulsion having a surface tension of 50 dyne/cm or more. Also, in the method of separating and removing water from water-containing oils, the water is transformed into coarse drops in an industrially advantageous manner by making the oil to be treated pass through said filter, and thus the water can be separated from the oil.

DETAILED DESCRIPTION OF THE INVENTION

As the fiber assemblies according to the present invention, those in any forms including short fibers, webs, non-woven fabrics, sheets of paper, etc. can be employed. But the use of opened short fibers is preferred in respect of uniform impregnation with the emulsion, regulation of the density of the formed product, etc. Also, the use of short fibers having a crimping ability is preferred because such fibers can remarkably correct the defect of fiber yielding upon the use of the filter. The fiber length of such short fibers is not limited, but in respect of formability, etc., it is desirable to employ those of 0.5 to 100 mm, more preferably those of 1 to 50 mm.

Although it is difficult to specify the kind of such fibers, it is desirable to employ fibers formed from a polymer having a SP value (solubility parameter) of 10.0 or more, preferably 12.0 or more. The use of fibers formed from a polymer having a SP value less than 10.0 is not desirable, since the effect of transforming the water in the oil into coarse drops is insufficient. As fibers having a SP value recommended in the present invention, there may be mentioned fibers of polyester (SP value 10.7), polyvinyl alcohol (12.6), polyamide (13.6), cellulose (more than 10.9), and acrylonitrile (15.4). Among others, acrylic fibers composed of a polymer containing more than 70 weight % of acrylonitrile are particularly preferable for the attainment of the objects of the present invention.

As the binder for impregnating and forming the fiber assembly, it is necessary to employ a polymeric aqueous emulsion having a surface tension of 50 dyne/cm or more, preferably 55 dyne/cm or more. The use of an emulsion not satisfying this requirement is not desirable since it is impossible to cause the fiber assembly to exhibit a satisfactory water-removing ability. As the emulsion necessary for the attainment of the objects of the present invention, any emulsion may be employed without limitation so far as it has a surface tension of at least 50 dyne/cm. For example, those emulsions prepared according to the methods described in Japanese Patent Publication Nos. 31280/1976 (U.S. Pat. No. 4,009,138), 20385/1961, Laid-Open Japanese Patent Application No. 40388/1974 Japanese Patent Publication No. 44157/1976), Japanese Patent Publication Nos. 10790/1959, (U.S. Pat. No. 3,306,871), 7134/1962, etc. and not containing a usual "low molecular emulsifier" can be employed advantageously. That is to say, there can be mentioned a method of polymerizing a monomer having an unsaturated radical-polymerizable bond, in the presence of an aqueous polymer containing at least one functional group, in an aqueous medium below pH 4; a method of copolymerizing at least one vinyl monomer having a functional group and at least one other radical-polymerizable monomer, in an aqueous medium; and/or a method of polymerizing at least one radical-polymerizable monomer in the presence of a polymerization catalyst which generates radicals having a functional group; etc. As such functional groups, there can be mentioned sulfonic, sulfuric or carboxylic acid groups or salts thereof; hydroxyl groups; amide groups; ethylene oxide groups, etc. Especially, when employing sulfonic acid groups or salts thereof as the functional groups, the objects of the present invention can be effectively attained. The above-mentioned emulsifier-free emulsions may be those to which a small quantity of emulsifier is added upon or after polymerization, so far as they have a surface tension of 50 dyne/cm or more.

The surface tension defined in the present invention is a value measured by the ring method using L. du Noüy's surface tensiometer, for an emulsion regulated so as to have a concentration of 40 weight %, at 30° C.

In the following, we explain the method of forming the fiber assembly, using the above-mentioned emulsion as binder.

As regards the shape of the filter, it can be formed into any desired shape such as cylinder, column, etc., depending on the kind of the apparatus to which the filter is fixed. As the method of forming the filter, any method can be employed so far as the filter can be formed into a desired shape, density, etc. For example, the fiber assembly is impregnated with an emulsion having a concentration of 10-50 weight %, preferably 20-30 weight %, so that the solid matter of the emulsion received by the fiber assembly will become 1-10 parts by weight for 100 parts by weight of said fiber assembly. Thereafter, by compressing and drying, by heat, the fiber assembly in a shaping vessel, the fiber assembly can be formed to have a density of 0.05-0.9 g/cm$^3$, preferably 0.15-0.4 g/cm$^3$. When the density is below the lower limit of the range recommended in the present invention, the water-removing ability will be lowered or the filter will be deformed during high speed operation. Also, when the density exceeds the upper limit, the pressure will be greatly increased during use of the filter. The heat-drying means are not limited at all. For example, a method may be employed wherein a hot air current is fed into the shaping vessel whereby shaping and drying are accomplished at the same time.

In the following, there will be mentioned the method for separating and removing the water in the oil to be treated, using the filter thus produced.

After the filter is fixed in a water-removing apparatus, the oil to be treated is caused to pass through the filter as upflow or downflow when the filter is of columnar shape, and as outflow or inflow when the filter is of cylindrical shape, so that the water finely dispersed in the oil being treated will be united to form coarse drops of an average diameter of or above 1 mm, preferably of or above 2 mm. The oil containing the thus-formed coarse drops of water, when allowed to stand still, can be separated from water by sedimentation of water. However, when it is caused to further pass through a second filter as mentioned below, the water in the oil will be more effectively transformed into coarse drops and at the same time, the sedimentation separation of the water drops will be accelerated. Thus, the use of the second filter enables a high-speed and continuous water-removing operation.

Such a second filter is one formed into a desired shape from a filter assembly composed of a single element product of water-swellable fibers having a water-swellability of generally 1-50 cc/g, preferably 2-20 cc/g, or composed of a compounded product of said fibers and other fibers. As the shape of such a filter, it is desirable to employ one formed into a cylindrical shape by winding a non-woven fabric, yarn, etc. made of said fiber assembly around an intermediate cylinder through which a plurality of holes have been perforated. For the attainment of the objects of the present invention, it is desirable that the density of the fiber assembly should be not more than 0.1 g/cm$^3$, and preferably 0.002-0.05 g/cm$^3$. When the density exceeds 0.1 g/cm$^3$, it is impossible to form water drops. As regards the kind of water-swellable fibers, any fibers can be used so far as the fibers have the above-mentioned water-swellability. It is desirable to employ water-swellable fibers as described in Laid-Open Japanese Patent Application No. 36360/1980, composed of a hydrogel outer layer and an inner layer of an acrylonitrile polymer and having crimps, since problems such as yielding of the fibers, gap clogging, etc. are not caused in that case. As other fibers which can be mixed with the water-swellable fibers as required, there can be mentioned natural fibers such as cotton, wool, etc.; regenerated or semi-synthetic fibers such as rayon, cupra, acetate, etc.; synthetic fibers such as fibers of polyolefin, polyamide, polyester, polyacrylonitrile, etc. Such other fibers are used at a mixing ratio of generally less than 95 weight %.

The oils to be treated with the water-removing filter include all those that are liquid under the water-removing treatment conditions and cause phase separation with water. (So far as phase separation occurs, a certain degree of mutual dissolution is permissible.) As those having such properties, there can be mentioned petroleum hydrocarbons such as petroleum ether, pentane, hexane, heptane, petroleum benzine, etc.; alicyclic saturated hydrocarbons such as cyclohexane, cyclooctane, etc.; aliphatic unsaturated hydrocarbons such as 1-octene, cyclohexene, etc.; aromatic hydrocarbons such as benzene, toluene, xylene, styrene, etc.; halogenated aliphatic hydrocarbons such as tetrachloroethylene, methylene chloride, chloroform, carbon tetrachloride, etc.; lubricating oils such as spindle oil, refrigerating machine oil, dynamo oil, turbine oil, machine oil, cylinder oil, marine engine oil, gear oil, cutting oil, hydraulic press oil, compressor oil, etc.

It is not exactly known why the filter formed with such a particular emulsion as mentioned above as the binder can separate and remove water by transforming the water finely dispersed stably in the oil into coarse drops. However, a possible supposition may be that combination of the characteristics of the polymer forming the fiber assembly and of the polymer in the emulsion (wettability to water, etc.) together with the dimensions of the gaps among the fibers, breaks down the emulsion state of the water finely dispersed in the oil, and causes the action of transforming the water into coarse drops as a result of the agglomeration and union of the water.

Such a water removing-filter according to the present invention can be advantageously used as a water-removing means for oils (oils to be treated) into which less than 50% water has been mixed. By causing the oil to be treated to pass through such a filter, the water can be separated and removed semi-permanently by being transformed into coarse drops. This is an advantage of the present invention worthy of special mention. It is a matter of great importance that the advent of such a filter makes it possible to industrially regenerate and reuse organic liquids (oils) which have been heretofore discarded or which have required a great deal of expense for their recovery.

For a better understanding of the present invention, examples will be described in the following. However, the scope of the present invention is not limited by these examples. All the parts and percentages in the examples are by weight unless otherwise indicated.

The content of water (%) and the water-swellability described in the examples are measured and/or calculated by the following methods.

(1) Content of water (%) in oil to be treated

The oil to be treated is taken into a 500 ml beaker. After allowing it to stand for one minute, one gram of the oil is collected from 2 cm below the surface, and is subjected to the Karl Fischer method.

(2) Degree of water-swellability (cc/g)

Sample fibers are immersed in pure water and the water is maintained at 25° C. After 24 hours, the fibers are wrapped in a nylon cloth (200 mesh) and the water remaining about the fibers is removed by a centrifuge at an acceleration of 3 G (G represents the acceleration of gravity) for 30 minutes. The weight of the sample fibers thus prepared is measured ($W_1$ g). The sample is then dried in a vacuum drier at 80° C. until it reaches a constant weight ($W_2$ g). From the above measurement results, the degree of water-swellability is calculated by the following formula:

Degree of water-swellability = $(W_1 - W_2)/W_1$

Accordingly, the degree of water-swellability is a numerical value showing how many times of water based on the fiber's own weight can be absorbed and retained by the fibers.

EXAMPLE 1

To 100 parts of a monomer mixture consisting of 70% methacrylic acid (MAA) and 30% sodium p-styrene sulfonate (SPSS), 0.0015 parts of ferrous chloride, 350 parts of water and 1.8 parts of sodium hydrogen sulfite (SHS) were added, and while stirring, the reaction system was maintained at 70° C. Then 50 parts of a 4% aqueous solution of ammonium persulfate (APS) was added dropwise so that the addition could be completed in one hour. After the addition was completed, the reaction system was maintained at 70° C. for an additional 30 minutes.

To a mixture composed of 20 parts of a 20% aqueous solution of the water-soluble polymer thus obtained, 0.0036 parts of ferrous chloride and 311 parts of ion-exchanged water, the monomers described in Table 1 (No. 1 to No. 3), aqueous solutions of 0.83 part of SHS and 1.0 part of APS, each dissolved in 50 parts of ion-exchanged water, were added dropwise respectively through dropping funnels to initiate polymerization. The polymerization system was maintained at 40° C., and was stirred at a rotation speed of 300 r.p.m. The addition of these monomers and the polymerization catalysts was regulated so that the addition could be finished in 40 minutes. After the addition was completed, the polymerization system was further aged for one hour and 20 minutes to produce aqueous polymer emulsions (a-c).

On the other hand, to a mixture composed of 244 parts of ion-exchanged water and 0.0036 part of ferrous chloride, a monomer mixture consisting of 50 parts of methyl methacrylate (MMA), 45 parts of butyl acrylate (BA) and 3 parts of N-methylolacrylamide (NMAM), and aqueous solutions of 2 parts of SPSS, 2.52 parts of SHS and 3 parts of APS, each dissolved in 50 parts of ion-exchanged water, were added dropwise respectively through dropping funnels to initiate polymerization. The polymerization system was maintained at 60° C., and was stirred at a rotation speed of 700-800 r.p.m. The addition speed of these monomers and polymerization catalysts was regulated so that the addition could be completed in 30 minutes. After the addition was completed, the polymerization system was stirred for an additional 2 hours to produce an aqueous polymer emulsion (d).

The above-mentioned emulsions (a-d), and as comparative examples, Denkatex AC-20 (Emulsion e; a vinyl chloride-vinyl acetate emulsion produced by The Elecro Chemical Industrial Co., Ltd.) and Emulsion (f) prepared by adding 0.5% o.w.p. sodium lauryl sulfate to Emulsion (a), were impregnated into bicomponent side-by-side type opened acrylic composite fibers (product of Japan Exlan Industries, Ltd.; single-filament fiber fineness: 6d; fiber length: 38 mm; SP value of the polymer forming the fibers: about 15) so that the solid matter of the emulsion would become 5% o.w.f. The emulsion-laden fibers were then placed into a shaping vessel, were compressed so that the fibers would have a density of 0.2 g/cm$^3$, an inner diameter of 32 mm, an outer diameter of 180 mm, and a height of 150 mm, and were dried in a hot air current of 60° C.

Each of the filters (A-F) thus produced was fixed into a water-removing apparatus, to which a turbine oil (milky state) containing 2% water dispersed therein was fed at a speed of 2 liters per minute. The oil being treated was made to pass through the filter from outside to inside (inflow) to remove the water. The results are shown in Table 1.

the fabric was dried. A white or slightly yellowish water-swellable non-woven fabric was obtained which had a weight per area of 16 g/m² and a density of 0.01 g/cm³. The outer layer of the acrylic fiber composing the non-woven fabric was hydrogelled and the fiber had a water-swellability of 6 cc/g.

This non-woven fabric was in one layer about an

TABLE 1

| Experiment | Filter | | Kind of emulsions Composition (parts) | Surface tension (dynes/cm) | Appearance | Oil after treatment Water content (%) | Remarks |
|---|---|---|---|---|---|---|---|
| 1 | A | a | MMA/BA/MAA/NMAM = 100/90/40/6 | 57 | transparent | 0.010 | Water drops of 2-4 mm diameter were formed |
| 2 | B | b | VDCl/MMA = 180/20 | 69 | " | 0.014 | in transparent oil. |
| 3 | C | c | ST/BA/MAA = 86/110/4 | 65 | " | 0.011 | After standing, |
| 4 | D | d | MMA/BA/NMAM/SPSS = 50/45/3/2 | 62 | " | 0.011 | the water drops were settled and separated. |
| 5 | E | e | Denkatex Ac-20 | 38 | milky | 0.12 | |
| 6 | F | f | — | 40 | milky | 0.079 | |

Note:
VDCl = Vinylidene chloride
ST = Styrene
Experiment nos. 1, 2, 3 and 4: Examples of the invention
Experiment nos. 5 and 6: Examples for comparison As apparent from the results in Table 1, the filters of the present invention are able to effectively transform finely dispersed water in oil into coarse drops and have an excellent water-removing ability.

Continuous operation for 70 days was carried out on Experiment no. 1, and it was confirmed that its water-removing power was not substantially lowered.

EXAMPLE 2

Water-removing treatment operation was carried out on oils containing dispersed water in various ratios, using the Filter A described in Example 1, and according to the procedure described in Example 1. The results are shown in Table 2.

TABLE 2

| Experiment no. | Water content in oil to be treated (%) | Oil after treatment Appearance | Water content (%) |
|---|---|---|---|
| 7 | 0.5 | Transparent | 0.011 |
| 8 | 5 | " | 0.014 |
| 9 | 10 | " | 0.012 |
| 10 | 30 | " | 0.018 |

It is apparent from the results in Table 2 that the filter of the present invention is able to exhibit an excellent water-removing effect for oils containing quantities of water over a wide range.

EXAMPLE 3

Blended fibers composed of the acrylic composite fiber described in Example 1 (however in this case single-filament fiber fineness: 2d; cut in various lengths) and bicomponent side-by-side type polyolefine composite fibers (low density polyethylene; crystalline polypropylene = 1:1; single-filament fiber fineness: 3d; fiber length: 51 mm) in the ratio of 70%:30%, were subjected to carding operation to form a web. The web was then dry-heat treated at 145° C. for 10 minutes to produce a non-woven fibric. A 30% aqueous solution of caustic soda was sprayed uniformly onto the non-woven fabric so that 30% o.w.f. would be deposited on the fabric. Thereafter, the fabric was placed in an autoclave. After heating in saturated steam at 105° C. for 4 minutes, the remaining alkali was removed by water washing, and intermediate tube having a diameter of 30 mm, a length of 247 mm, and 720 small holes, each 3 mm in diameter, perforated therethrough, to produce a second filter.

The oil treated in Experiment no. 1 of Example 1 was further treated by a water-removing apparatus to which the second filter was fixed. Water drops of 3-6 mm diameter were formed in the oil and were sedimented rapidly. Thus, it was possible to separate and remove the water continuously. The content of water in the oil after treatment was 0.009%.

EXAMPLE 4

Polyamide fibers (single-filament fiber fineness: 3d; fiber length: 5 mm; SP value of the polymer forming the fibers: above 13) were impregnated with the Emulsion (c) described in Example 1, and were formed into a filter according to the procedure described in Example 1. Using this filter, water-removing treatment operation was carried out. Water drops of 1-3 mm diameter were formed in the oil. The water content of the oil after treatment was found to be 0.012%.

What we claim is:

1. A water-removing filter for removing water from a water-containing oil, which comprises an assembly of fibers formed from a polymer having a SP value (solubility parameter) of at least 10.0 and, as a binder for impregnating and forming the fiber assembly, a polymeric aqueous emulsion having a surface tension of at least 50 dynes/cm, wherein the density of the filter is from 0.05 to 0.9 g/cm³.

2. The water-removing filter as claimed in claim 1 wherein the fibers have a length of from 0.5 to 100 mm.

3. The water-removing filter as claimed in claim 1 wherein the fibers are acrylic fibers.

4. The water-removing filter as claimed in claim 1 wherein the polymeric aqueous emulsion is prepared by polymerizing a monomer having an unsaturated radical-polymerizable bond, in the presence of an aqueous polymer containing at least one functional group, in an aqueous medium below pH 4.

5. A method of separating and removing water from water-containing oil, which comprises passing the oil through a filter comprising an assembly of fibers formed from a polymer having a SP value (solubility parameter) of at least 10.0 and, as a binder for impregnating and forming the fiber assembly, a polymeric aqueous emulsion having a surface tension of at least 50 dynes/cm, wherein the density of the filter is from 0.05 to 0.9 g/cm$^3$.

6. The method of removing water as claimed in claim 1 wherein the water passed through the filter is thereby transformed into coarse drops having an average diameter above 1 mm.

7. The method of removing water as claimed in claim 5 wherein the fibers have a length of from 0.5 to 100 mm.

8. The method of removing water as claimed in claim 5 wherein the fibers are acrylic fibers.

9. The method of removing water as claimed in claim 5 wherein, after the oil is passed through said filter, the oil is further passed through a second filter formed of a fiber assembly comprising a single element product of water-swellable fibers having a degree of water-swellability of 1–50 cc/g, or a compounded product of said water-swellable fibers and other fibers.

10. The method of removing water as claimed in claim 9 wherein, in the second filter, the fiber assembly has a density of not more than 0.1 g/cm$^3$.

11. The method of removing water as claimed in claim 5 wherein the polymeric aqueous emulsion is prepared by polymerizing a monomer having an unsaturated radical-polymerizable bond, in the presence of an aqueous polymer containing at least one functional group, in an aqueous medium below pH 4.

* * * * *